United States Patent [19]

Kast

[11] 4,248,040
[45] Feb. 3, 1981

[54] INTEGRATED CONTROL SYSTEM FOR A GAS TURBINE ENGINE

[75] Inventor: Howard B. Kast, Fairfield, Ohio
[73] Assignee: General Electric Company, Cincinnati, Ohio
[21] Appl. No.: 45,512
[22] Filed: Jun. 4, 1979
[51] Int. Cl.³ .................................................. F02C 9/04
[52] U.S. Cl. ................................ 60/39.27; 60/39.28 R
[58] Field of Search .............. 60/39.28 R, 39.28 P, 60/223, 39.27

[56] References Cited

U.S. PATENT DOCUMENTS

| 3,937,588 | 2/1976 | Kisslan | 60/223 |
| 3,975,902 | 8/1976 | Smith et al. | 60/39.28 R |
| 4,077,203 | 3/1978 | Burnell et al. | 60/39.28 R |
| 4,142,364 | 3/1979 | Wanger | 60/39.28 R |

Primary Examiner—Robert E. Garrett
Attorney, Agent, or Firm—Derek P. Lawrence

[57] ABSTRACT

An improved integrated control system for a gas turbine engine includes fuel control means for metering the flow of fuel to the engine in accordance with a fuel control position signal. A primary control means generates a primary fuel control position signal. A back-up control means generates a back-up fuel control position signal as a function of the actual engine speed in a primary mode and as a function of the power lever angle in a back-up mode. Transfer means is included to receive both the primary and back-up fuel control position signals and to provide only the primary signal to the fuel control means when the system in the primary mode and to provide only the back-up signal to the fuel control means when the system is in the back-up mode.

5 Claims, 2 Drawing Figures

INTEGRATED CONTROL SYSTEM FOR A GAS TURBINE ENGINE

BACKGROUND OF THE INVENTION

1. Field of the Invention

This invention relates to a control system for a gas turbine engine and, more particularly, to an improved integrated control system including a primary control, a parallel operating back-up control, the latter providing for continued operation of the engine in the event of a malfunction or failure of the primary control.

2. Description of the Prior Art

The need for the electronic engine control relates fundamentally to the increased complexity, i.e., number of controlled engine variables, inherent cycle variability, inlet-engine-exhaust control integration, of the next generation of sophisticated variable cycle engines. This level of engine complexity and the expanding need for more complete aircraft/engine control integration forces a commensurate increase in the complexity and required capability of the control system. This increased control system capability is needed to provide stable, responsive, safe, and precise engine control. Digital electronics represents the only viable means of meeting the significantly more sophisticated requirements of the variable cycle engine of the future. With its inherent ability to "time-share" in the computational section of the control, increasing requirement complexity yields a very much smaller increase in hardware when compared to present control system mechanizations. Digital electronics also lends itself to "hardening" to the aircraft engine environment through hybrid construction, packaging, and environmental conditioning techniques.

Full authority electronic control systems for gas turbine engines provide a number of significant advantages over conventional hydromechanical control systems. However, since full authority electronic control systems are only advancing to what might be termed a first generation level, confidence in the reliability of such electronic controls has not attained the level generally associated with the hydromechanical systems which have been in use for many years in highly refined configurations. Consequently, it is advisable to complement the primary electronic control with a secondary or back-up control which will assure continued operation of the engine in the event the primary electrical control exhibits a malfunction or a failure.

Prior art control systems, for example the "Integrated Control System for a Gas Turbine Engine" as disclosed in U.S. Pat. No. 4,137,707, have typically comprised a primary electronic control in combination with a hydromechanical back-up control. Although such systems function well, they are relatively complex in terms of hardware and add unnecessary weight to the control system. In addition, such systems are relatively expensive to produce.

Another problem associated with some prior art control systems is that when switching from the primary control to the back-up control (or vice versa) the change may result in a step-type change causing an immediate alteration in the operation of the engine. It is also possible that uncontrolled transients could be introduced into the engine as control is transferred. Both step-type changes and transients in the engine are undesirable since they may require immediate operator attention at a time when the operator can least afford it.

It is, therefore, an object of the present invention to provide an integrated control system which is capable of reliably controlling a relatively complex gas turbine engine.

It is another object of the present invention to provide such a control system which is relatively lightweight and inexpensive to produce.

It is a further object of the present invention to provide such a system which is fully compatible with the present trend toward fully electronic controls.

SUMMARY OF THE INVENTION

Briefly stated, these objects, as well as additional objects and advantages which will become apparent from the following description and the appended drawings and claims, are accomplished by the present invention which provides an improved integrated control system for a gas turbine engine. The control system includes fuel control means for metering the flow of fuel to the engine in accordance with a fuel control position signal. A primary control means generates a primary fuel control position signal. A back-up control means generates a back-up fuel control position signal as a function of the actual engine speed in a primary mode and as a function of the power lever angle in a back-up mode. Transfer means is included to receive both the primary and back-up fuel control position signals and to provide only the primary signal to the fuel control means when the system is in the primary mode and to provide only the back-up signal to the fuel control means when the system is in the back-up mode.

PREFERRED EMBODIMENT

Figure 1:
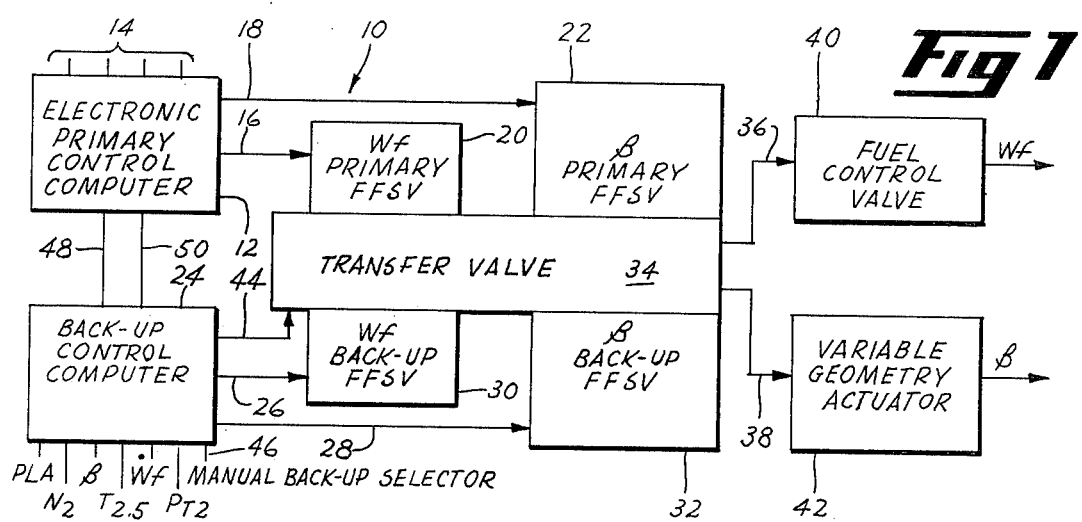
FIG. 1 shows a block diagram of the control system on the invention.

Referring to the drawing wherein like numerals correspond to like elements throughout, attention is first directed to FIG. 1 wherein a simplified block diagram representation of an improved gas turbine engine control system made in accordance with the present invention is depicted generally as 10. The control system 10 includes primary control means 12 in the form of a primary control computer which receives a number of input signals via a plurality of conducting means, hereinafter called "lines" and shown collectively as 14. The input signals to the primary control computer 12 are representative of ambient conditions, selected engine operating parameters and a power lever angle (PLA) as set by the engine operator. Typical examples of these input signals may include fan inlet temperature and pressure, compressor discharge pressure, turbine inlet temperature, fan and core engine rotational velocities and the rate of fuel flow.

The primary control computer 12, which may be of any type (for example hydromechanical), but which in the best mode contemplated by the invention is a fully integrated digital electronic control, receives the various input signals and generates an electrical primary fuel control position signal (Wf) and an electrical primary geometry control position signal ($\beta$).

It is believed that a more detailed presentation of the specific design of the primary control computer 12 is not necessary for an understanding of the present invention. Suffice it to say that the primary control computer 12 compares the selected engine operating parameter input signals with reference values (which are stored or calculated as a function of the received ambient condition input signals) and the power lever angle input signal, to determine the deviation of the engine from a specific engine output as required by the engine operator. Accordingly, the primary control computer generates the aforementioned primary fuel and geometry control position signals for the purpose of changing the fuel flow and/or variable engine geometry component position (for example, variable compressor vanes) in order to achieve and maintain the operator required engine output.

The primary control computer generated electrical control position signals (Wf and $\beta$) are transmitted along lines 16 and 18, respectively, to a pair of primary electrohydraulic fail-fixed servovalves 20 and 22. The primary fail-fixed servovalves 20 and 22 are substantially the same as the fail-fixed servovalve which is described and claimed in U.S. Pat. No. 3,922,955 which is incorporated herein by reference. A detailed presentation of the specific design and operation of the fail-fixed servovalves 20 and 22 may be obtained from the aforementioned U.S. Patent and is not believed to be necessary in order to provide an understanding of the present invention. Suffice it to say that each of the primary fail-fixed servovalves 20 and 22 receives an electrical control position signal from the primary control computer 12 and converts it to a hydraulic control position signal. In the event that an electrical control position signal becomes zero, for example, due to breaking of one or more control lines 16 or 18, or exceeds a maximum value, for example, due to the malfunctioning of the primary control computer 12, the hydraulic control position signal from the associated fail-fixed servovalve results in an essentially fixed servopiston.

The control system 10 also includes a back-up control means 24 which operates in parallel with the primary control computer 12 and which in this embodiment is in the form of an electronic back-up control computer. The back-up control computer receives a variety of hereinafter described input signals and constantly generates (in a manner hereinafter to be described) an electrical back-up fuel control position signal (Wf') and an electrical back-up geometry control position signal ($\beta'$), which are transmitted along lines 26 and 28, respectively, to a pair of electrohydraulic fail-fixed servovalves 30 and 32. The back-up fail-fixed servovalves 30 and 32 are substantially the same as the fail-fixed servovalve which is described and claimed in the aforementioned U.S. Pat. No. 3,922,955 and a more detailed description of their specific design and operation is not believed to be necessary in order to provide an understanding of the present invention. Suffice it to say that each of the back-up fail-fixed servovalves receives an electrical control position signal from the back-up control computer 24 and converts it to a hydraulic control position signal in the same manner as the primary fail-fixed servovalves 20 and 22.

The outputs of the primary fail-fixed servovalves 20 and 22 and the back-up fail-fixed servovalves 30 and 32 are fed into a transfer means 34, which in this embodiment is an electrohydraulic transfer valve.

The transfer valve 34 operates in the manner of a hydraulic switch. In a first or primary mode position, it passes only the hydraulic control position signals from the primary fail-fixed servovalves 20 and 22. In a second or back-up mode position, the transfer valve 34 passes only the hydraulic control position signals from the back-up fail-fixed servovalves 30 and 32. The transfer valve 34 is spring and pressure loaded to remain in the primary mode position unless an electrical transfer valve actuation signal (hereinafter to be described) is received over line 44 from the back-up control computer 24. The purpose of having the transfer valve 34 operate in such a manner is to protect against an inadvertent transfer to the back-up mode position if the back-up control computer power has failed.

The detailed design and construction of a transfer valve which is capable of performing the above-described functions is within the capabilities of persons skilled in the art and is not believed to be necessary in order to provide an understanding of the present invention.

The hydraulic control position signals passed by the transfer valve 34 are transmitted along hydraulic lines 36 and 38, respectively, to a fuel control means or fuel control valve 40 and a variable geometry control means or variable geometry actuator 42. Both the fuel control valve 40 and the variable geometry actuator may be of any suitable type which is known by those skilled in the art. It is believed that a detailed description of their design and operation is not necessary for an understanding of the present invention.

The control system 10 normally operates in a primary mode in which the electrical control position signals (Wf and $\beta$) generated by the primary control computer 12, are converted into hydraulic signals by the primary fail-fixed servovalves 20 and 22, and are provided through the transfer valve 34 to the fuel control valve 40 and the variable geometry actuator 42 to maintain the operator required engine output. While the control system 10 is operating in the primary mode electrical control position signals (Wf' and $\beta'$) are also generated by the back-up control computer 24 and are converted into hydraulic signals by the back-up fail-fixed servovalves 30 and 32. However, the back-up control hydraulic position signals are prevented (by the transfer valve 34) from reaching the fuel control valve 40 or the variable geometry actuator 42. When the control system 10 is operating in the back-up mode, the situation is reversed and the back-up control hydraulic position signals are provided to the fuel control valve 40 and the variable geometry actuator 42 and the primary hydraulic control position signals are blocked.

Transferring the control system 10 from the primary mode to the back-up mode is controlled by the back-up control computer 24 and is initiated by the occurrence of any one of four following events:

1. Engine operator action—In the event that the engine operator decides that it is desirable to operate the control system 10 in the back-up mode, he merely closes a switch on the operator's console (not shown). Such action sends an electrical transfer signal via line 46 to the back-up control computer 24.

2. Loss of power—In the event the electrical power supplied to the primary control computer is lost or exceeds certain predetermined limits, an electrical transfer signal is sent via line 48 to the back-up control computer 24.

3. Overspeed—Circuitry (hereinafter to be described in greater detail), within the back-up control computer 24 generates an electrical transfer signal in the event an engine overspeed condition occurs.

4. Primary Control Computer Fault—Circuitry (not shown) within the primary control computer 12 monitors certain aspects of the operation of the primary control computer 12. In the event abnormal or faulty operation is detected, an electrical transfer signal is generated and transmitted to the back-up control computer along line 50.

If any of the above-described four events occurs, an electrical transfer valve actuation signal, which in this embodiment is comprised of a positive eighty milliamp (+88 ma) signal, is transmitted to the transfer valve 34 from the back-up control computer 24 along line 44. Upon receiving the +80 ma transfer valve actuation signal the transfer valve 34 strokes to the back-up mode position and the control system 10 operates in the back-up mode.

Figure 2:
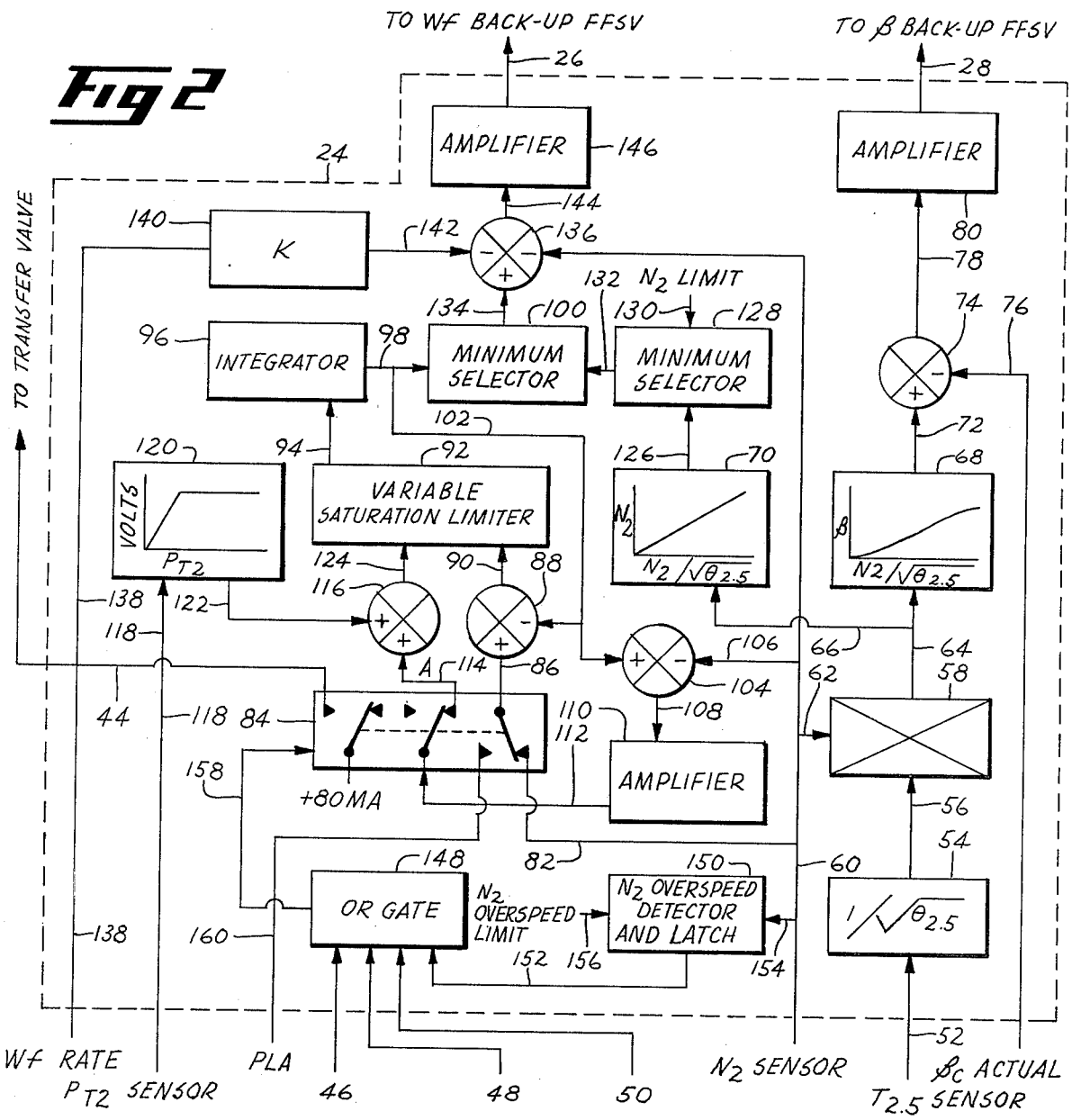
FIG. 2 shows a detailed block diagram of the back-up control computer 24 of FIG. 1.

Referring to FIG. 2, there is depicted a more detailed block diagram of the back-up control computer 24. The best approach contemplated by the invention for implementing the back-up control computer 24 is utilizing fully integrated digital electronics. It should be understood, however, that such implementation could also be accomplished in other manners, for example, utilizing analog electronics or hydraulics. An analog electronic approach is discussed below.

The back-up control computer 24 receives a variety of input signals and generates an electronic back-up fuel control position signal (Wf') and an electrical back-up geometry control position signal ($\beta'$) which are output along lines 26 and 28, respectively. When the control system 10 is operating in the primary mode, these output signals are both generated as a function of the actual engine rotational speed, (and other variables such as T2.5 and PT2) which in this embodiment is measured by the compressor speed - $N_2$. The parallel operated back-up control computer 24 is tracking the engine rather than the primary control computer 12, so that if a transfer to the back-up mode occurs, it can be accomplished without a jump or dip in the engine output. When the control position system 10 is operating in the back-up mode, the back-up fuel control signal is generated as a function of the power lever angle - PLA.

In order to generate the back-up geometry control position signal an electrical signal representative of the engine's compressor inlet temperature (hereinafter referred to as T2.5) is generated by a sensor (not shown) and is transmitted along line 52 to the back-up control computer 24. The T2.5 signal is fed to a function generator 54 which generates a signal which is representative of an airflow parameter $1/\sqrt{\theta 2.5}$ where $\theta 2.5$ is defined as T2.5 (in degrees Rankine) divided by the standard-day temperature (518.7° R). The function generator 54 and other function generators hereinafter to be described may be comprised of conventional analog or digital electronic circuits in which the required function may be stored or calculated.

The airflow parameter signal is transmitted from function generator 54 along line 56 to a multiplier 58. A signal representative of the actual engine rotational speed (hereinafter referred to as N2) is generated by a speed sensor (not shown) and is transmitted along lines 60 and 62 to the multiplier 58. The output of the multiplier 58 is a signal representative of $N2/\sqrt{\theta 2.5}$ which is transmitted along lines 64 and 66 to function generators 68 and 70, respectively. The required functional relationships from function generators 68 and 70 may be obtained from actual or projected engine operational data.

Function generator 68 receives the $N2/\sqrt{\theta 2.5}$ signal and generates a geometry control demand signal $\beta'$ which is transmitted via line 72 to a summer 74. The summer 74 also receives a feedback signal representative of the actual position of the variable geometry actuator ($\beta a$) which is received from a sensor (not shown) along line 76. The two signals are compared by the summer 74 and the resulting back-up geometry control position error signal ($\Delta\beta'$) is transmitted along line 78 to an amplifier 80. The amplified $\Delta\beta'$ signal is transmitted along line 28 as hereinbefore described to the back-up geometry control fail-fixed servovalve 32.

As hereinbefore described when the control system 10 is operating in the primary mode the back-up control computer 24 "tracks" the engine. A signal representative of the actual engine rotational speed N2 is transmitted along lines 60 and 82, passes through a normally closed contact within a switching means or relay 84 and is fed along line 86 to a summer 88. Summer 88 compares the N2 feedback signal with an integrated speed demand signal (hereinafter to be described) and transmits the resulting signal along line 90 to a variable saturation limiter 92. The variable saturation limiter 92 is a device which determines the direction and the integration rate. Its output goes to the integrator.

The speed demand signal output of the variable saturation limiter 92 is transmitted along line 94 to an integrator 96. The purpose of the integrator 96 is to maintain the integrated speed demand signal at a level substantially the same as the actual rotational speed signal N2. The output of the integrator 96 is a rate limited speed request signal which is passed along line 98 to a minimum selector 100 and is also transmitted along line 102 as a feedback signal for summer 88, and for summer 104.

Summer 104 compares the integrated speed demand feedback signal with the actual speed signal received along lines 60 and 106 and generates a difference signal or speed error signal which is transmitted along line 108 to an amplifier 110. The amplified speed error signal is transmitted along line 112, through a normally closed contact relay 84 and is fed along line 114 to a summer 116.

A signal indicative of the engine total inlet pressure (PT2) is generated by a sensor (not shown) and is transmitted along line 118 to a function generator 120. Function generator 120 generates a speed rate signal as a function of the total inlet pressure which is transmitted along line 122 to summer 116. Summer 116 adds the PT2 generated speed rate signal with the amplified speed error signal received along line 114. The resulting signal is fed along line 124 to the variable saturation limiter 92. The variable saturation limiter determines an integration rate and direction as a function of the two inputs.

A corrected speed signal (N2C) is generated by function generator 70 and is passed along line 216 to a minimum slector 128. The minimum selector 128 also receives via line 130 a signal representative of a maximum engine rotational speed limit which has been predetermined by the engine manufacturer based upon the design and operational characteristics of the engine. The output of the minimum selector 128 (the most negative of the two received signals) is a corrected limited speed signal which is transmitted along line 132 to minimum selector 100.

Minimum selector 100 receives the corrected limited speed signal along line 132 and the integrated speed demand signal along line 98 and selects the most negative of the two signals for transmission along line 134 to a summer 136.

Summer 136 also receives a signal representative of the actual engine rotational speed (along line 60) and a signal indicative of the fuel flow rate (Ẇf) which is generated by a metering valve velocity sensor and is passed along line 138, through condition and amplifying circuitry 140 and along line 142. Summer 136 compares the three received signals and generates a back-up fuel control position signal (Wf') which is transmitted along line 144 to an amplifier 146. The amplified Wf' signal is transmitted along line 26 (as hereinbefore described) to the back-up fuel control fail-fixed servovalve 30.

As hereinbefore described, the control system 10 transfers from the primary mode to the back-up mode upon the occurrence of any one of the four above-described events. The actual transfer is controlled by the back-up control computer 24 and is implemented as follows.

A device having the characteristics of a four input OR gate 148 is included within the back-up control computer 24. A first input signal indicative of the engine operator's decision to operate in the back-up mode may be provided to the OR gate 148 along line 46. A second input signal, generated within the primary control computer 12 and indicative of the loss of primary power may be provided to the OR gate 148 along line 48. A third input signal generated by fault detection circuitry (not shown) within the primary control computer 12 and indicative of a primary control fault may be provided to the OR gate 148 along line 50. A fourth input signal generated by the overspeed detector and latch circuitry 150 and indicative of an engine overspeed condition may be provided to the OR gate 148 along line 152.

The overspeed detector and latch circuitry 150 operates by comparing a signal representative of the actual engine speed received along lines 60 and 154 with a signal representative of an engine overspeed limit (typically 105% of the rated maximum speed of the engine) received along line 156. In the event the actual engine speed exceeds the rated maximum speed, a signal is generated and is latched. The reason for latching the overspeed signal is to prevent the control system 10 from cycling back to the primary mode as soon as the engine is no longer in a overspeed condition. Thus, once an overspeed condition occurs, the signal transmitted along line 152 to the OR gate 148 is continuous.

If any one of the above-described four signals is received by the OR gate 148 a switching signal is transmitted along line 158 to activate the relay 84. As long as the switching signal is received by the relay 84, the three switches move to the left (as shown in FIG. 2) thereby accomplishing the following:

1. A positive eighty milliamp signal is transmitted along line 44, causing the transfer valve 34 to stroke to the back-up mode position, thereby transferring the control system 10 to the back-up mode.

2. The rate limited speed request feedback circuit which had been employed in the primary mode to speed up the integration rate in order to keep the back-up speed demand essentially equal to the actual engine speed is disconnected. This has the effect of slowing down the integration rate and so that the integration or speed rate in the back-up mode is a function of PT2 only.

3. The upstream speed request signal is transferred from $N_2$ to PLA transmitted along line 160 in order to give the operator control of the engine operation.

Once the transfer to the back-up mode has occurred, the back-up control operates essentially as described except for the slowing of the integration rate and the substitution of the PLA signal.

From the foregoing description it can be seen that the present invention comprises an integrated control system which has the capability of controlling a relatively complex gas turbine engine with a high degree of reliability and with reduced weight and cost. It will be recognized by one skilled in the art that changes may be made to the above-described invention without departing from the broad inventive concepts thereof. It is to be understood, therefore, that this invention is not limited to the particular embodiment disclosed, but it is intended to cover all modifications which are within the scope and spirit of the invention as set forth in the appended claims.

What is claimed is:

1. An improved integrated control system for a gas turbine engine which includes:
   fuel control means for metering the flow of fuel to the engine in accordance with a received fuel control position signal; and
   primary control means for generating a primary fuel control position signal; wherein the improvement comprises:
   back-up control means for generating a back-up fuel control position signal, said back-up fuel control position signal being generated as a function of the actual engine rotational speed when the control system is operating in a primary mode and as a function of the power lever angle when the control system is operating in a back-up mode; and
   transfer means for receiving said primary fuel control position signal and said back-up fuel control position signal and for providing said primary fuel control position signal to said fuel control means when the control system is operating in a primary mode and said back-up fuel control position signal to said fuel control means when the control system is operating in a back-up mode.

2. The control system as set forth in claim 1 and further including variable geometry control means for controlling the position of a variable component of the engine in accordance with a received geometry control position signal wherein:
   said primary control means generates a primary geometry control position signal;
   said back-up control means generates a back-up geometry control position signal, as a function of the actual engine rotational speed and compressor inlet temperature; and
   said transfer means receives said primary geometry control position signal and said back-up geometry control position signal and provides said variable geometry control means with said primary geometry control position signal when the control system is operating in a primary mode and said back-up geometry control position signal when the control system is operating in a back-up mode.

3. The control system as set forth in claim 1 and further including means for effectuating a transfer from the primary mode to the back-up mode in the event an engine overspeed condition occurs.

4. The control system as set forth in claim 1 and further including means for effectuating a transfer from the primary mode to the back-up mode in the event that the primary control means looses primary power.

5. The control system as set forth in claim 1 and further including means for effectuating a transfer from the primary mode to the back-up mode in the event of faulty or abnormal operation of the primary control means.

* * * * *